(12) United States Patent
Chen

(10) Patent No.: US 7,701,444 B2
(45) Date of Patent: Apr. 20, 2010

(54) MOUSE HAVING A CHANGEABLE PAD

(76) Inventor: Cheng-Hsiung Chen, 4F, No. 22, Sec. 6, Hsin I Rd., Taipei (TW)

( * ) Notice: Subject to any disclaimer, the term of this patent is extended or adjusted under 35 U.S.C. 154(b) by 794 days.

(21) Appl. No.: 11/508,975

(22) Filed: Aug. 24, 2006

(65) Prior Publication Data

US 2008/0048981 A1  Feb. 28, 2008

(51) Int. Cl.
*G06F 3/033* (2006.01)
(52) U.S. Cl. ..................... 345/163; 345/164
(58) Field of Classification Search ......... 345/163–165; 463/37
See application file for complete search history.

(56) References Cited

U.S. PATENT DOCUMENTS 5,355,147 A * 10/1994 Lear ........................... 345/156
6,262,714 B1 * 7/2001 Yu-Chih ..................... 345/163
6,373,467 B1 * 4/2002 Slowinski et al. ........... 345/163
2006/0187206 A1 * 8/2006 Jing ........................... 345/163
2007/0242044 A1 * 10/2007 Chang ........................ 345/163

* cited by examiner

*Primary Examiner*—Chanh Nguyen
*Assistant Examiner*—Kwang-Su Yang
(74) *Attorney, Agent, or Firm*—Rosenberg, Klein & Lee

(57) ABSTRACT

A mouse having a changeable pad is comprised of a case, at least one replacement board and a plurality of pads. The replacement board is installed in the bottom of the case. The pads are installed on both faces of the replacement board. When the pad on the first face of the replacement board becomes worn out, the replacement board can be turned over and the pad on the second face of the replacement board can be installed in the bottom of the case for increasing the pad's user life.

6 Claims, 4 Drawing Sheets

MOUSE HAVING A CHANGEABLE PAD

BACKGROUND OF THE INVENTION

1. Field of the Invention

The present invention relates to a mouse having a changeable pad, and more particularly to a mouse having a changeable pad that increases the pad's user life.

2. Description of the Prior Art

A mouse has long been an important tool for operating a computer. Users can freely and easily control and operate the computer via the mouse. Today, due to the progress of software and the universality of graphic user interfaces (GUIs), the mouse has become an essential input device for computers.

The bottom of the mouse of the prior has a plurality of pads. When moving the mouse, the mouse contacts the face of a desktop or a cushion via the pads. But the pads eventually become worn and even fall off after the mouse has been used for a long time, causing the mouse's movements to irregular so that handling the mouse becomes frustrating and difficult.

The inventor of the present invention recognizes the above shortage should be corrected and special effort has been paid to research this field. The present invention is presented with reasonable design and good effect to resolve the above problems.

SUMMARY OF THE INVENTION

It is a primary object of the present invention to provide a mouse having a changeable pad. A replacement board with pads on both faces is installed in the bottom of the case of the mouse. When the pad on the first face of the replacement board becomes worn out, the user can turn the replacement board over and use the pad for the second face of the replacement board.

Another object of the present invention to provide a mouse having a changeable pad, that can be altered according to the user's habits and demands to adjust the friction between the mouse and the desktop.

For achieving the objectives stated above, the present invention provides a mouse having a changeable pad comprising of a case, at least one replacement board, and a plurality of pads. The replacement board is installed in the bottom of the case. The pads are installed on both faces of the replacement board.

Therefore when the pad on the first face of the replacement board of the mouse is worn out, the user can quickly get the replacement board out of the mouse and change the pad on the second face of the replacement board to ensure the normal operating of the mouse.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The above and further advantages of this invention may be better understood by referring to the following description, taken in conjunction with the accompanying drawings, in which.

The drawings will be described further in connection with the following detailed description of the present invention.

DETAILED DESCRIPTION OF THE PREFERRED EMBODIMENTS

Figure 1:
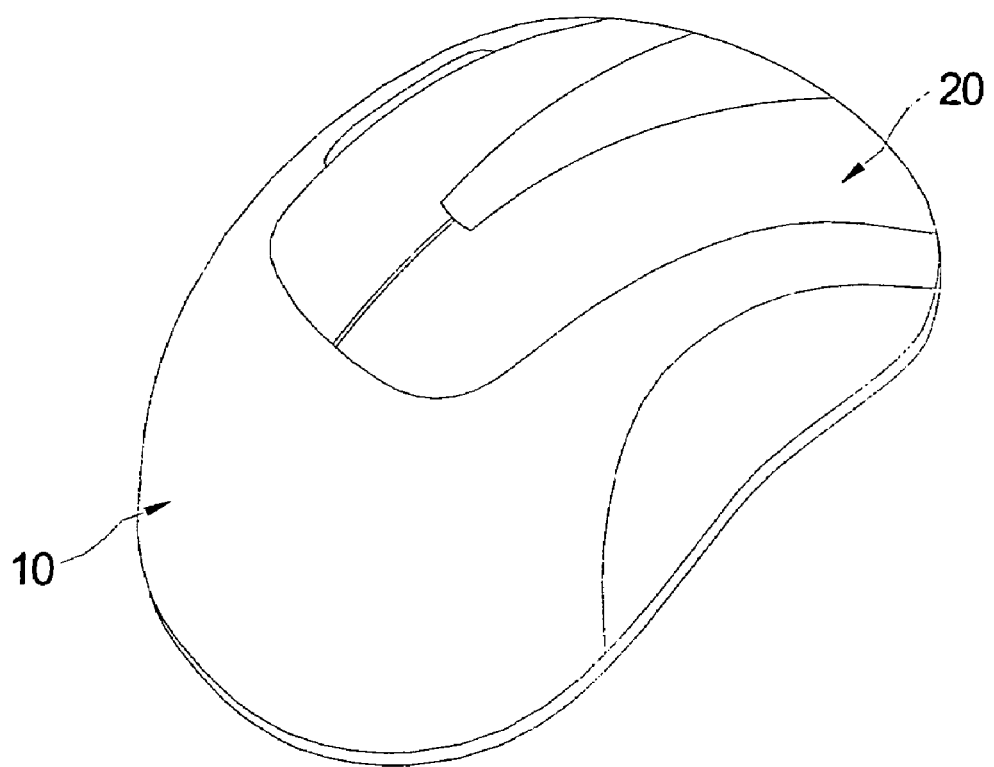
FIG. 1 is a perspective view of a mouse according to the present invention.
Figure 2:
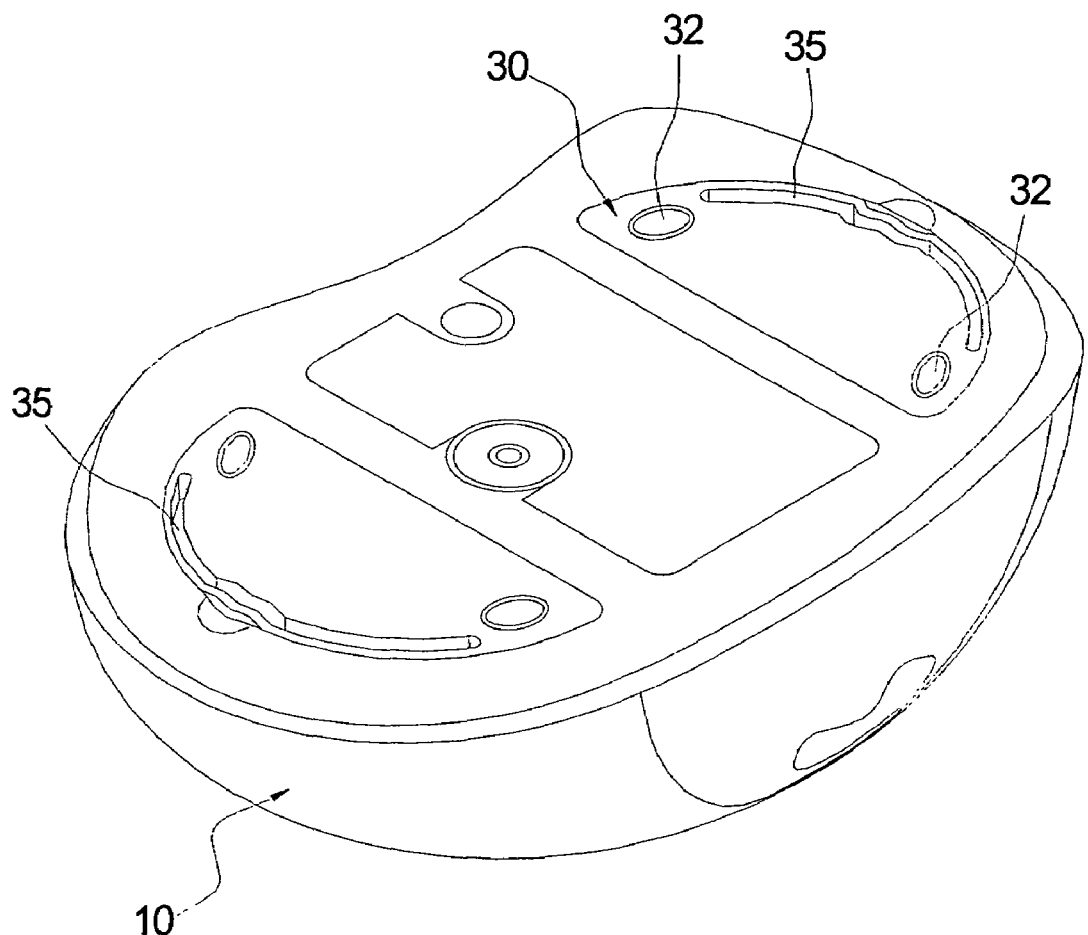
FIG. 2 is another perspective view of the mouse according to the present invention.
Figure 3:
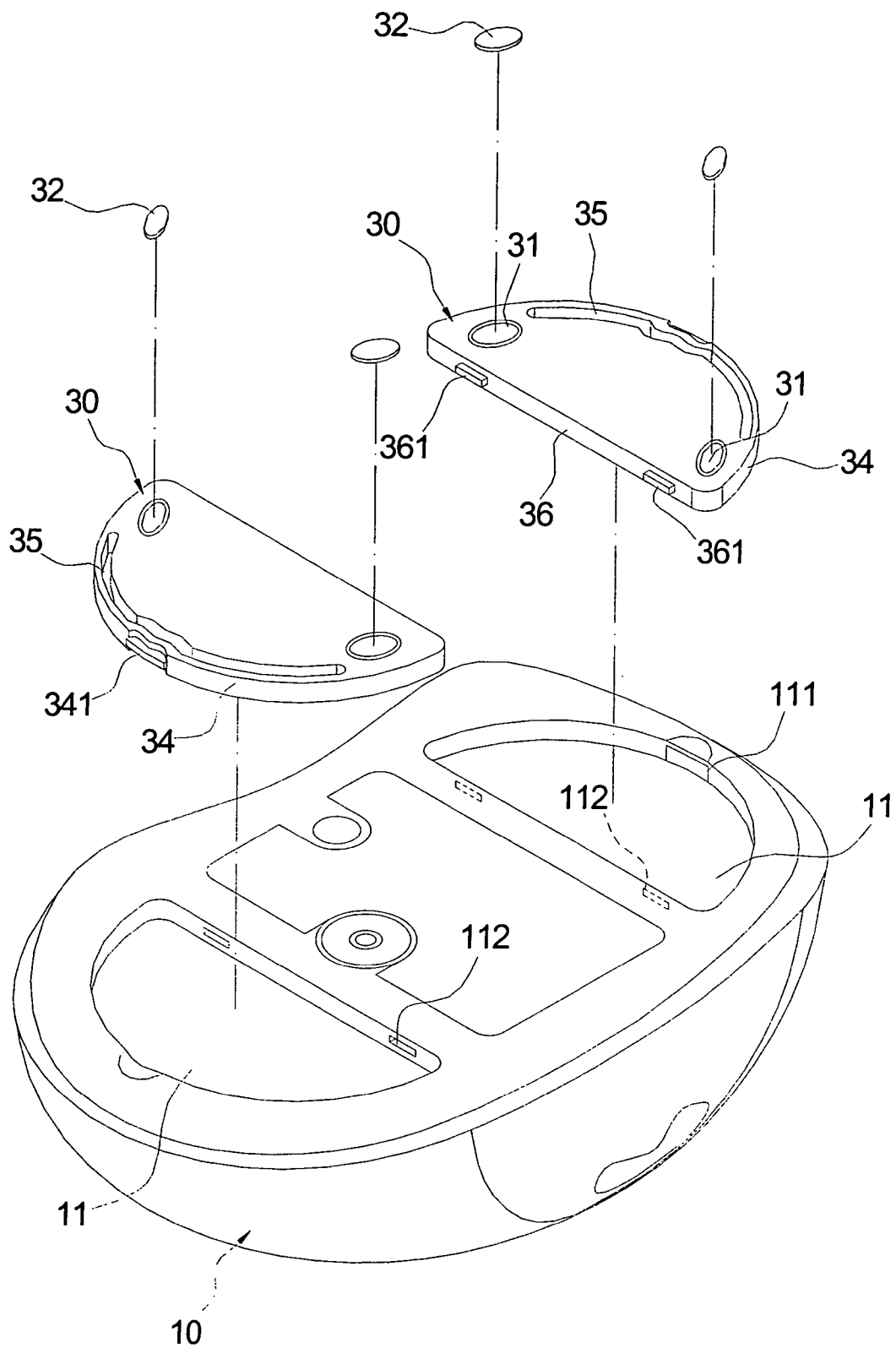
FIG. 3 is a perspective, exposed view of the mouse according to the present invention.

Reference is made to FIGS. 1 to 3. The mouse having a changeable pad according to the present invention includes a case 10, a cursor control unit (not shown), a plurality of keys, and two replacement boards.

The case 10 is hollow and made of a plastic. The case 10 has a circuit board (not shown) disposed inside the case 10. The replacement notches 11 with semicircle shape are separately disposed in the front and rear of the bottom of the case 10 for containing the replacement boards.

The cursor control unit is installed in the circuit board and electrical connected with the circuit board. The cursor control unit extends to an outside of a bottom of the case 10 to control the motion direction and distance of the mouse cursor.

The keys 20 are installed on the case 10 and electrical connected with the circuit board. Pressing the keys 20 executes a function of a function table command, such as selecting an object, pressing a button or an item of a block, turning a page, or showing a quick menu, etc. The mouse can further include a roller used for rolling the window page.

The two replacement boards 30 are semicircle shape boards. One face of the replacement has two elliptic fixing position notches 31 installed symmetrically. The two elliptic fixing position notches 31 respectively contain the elliptic first pads 32. The first pads 32 protrude to the surface of the replacement board 30.

Figure 4:
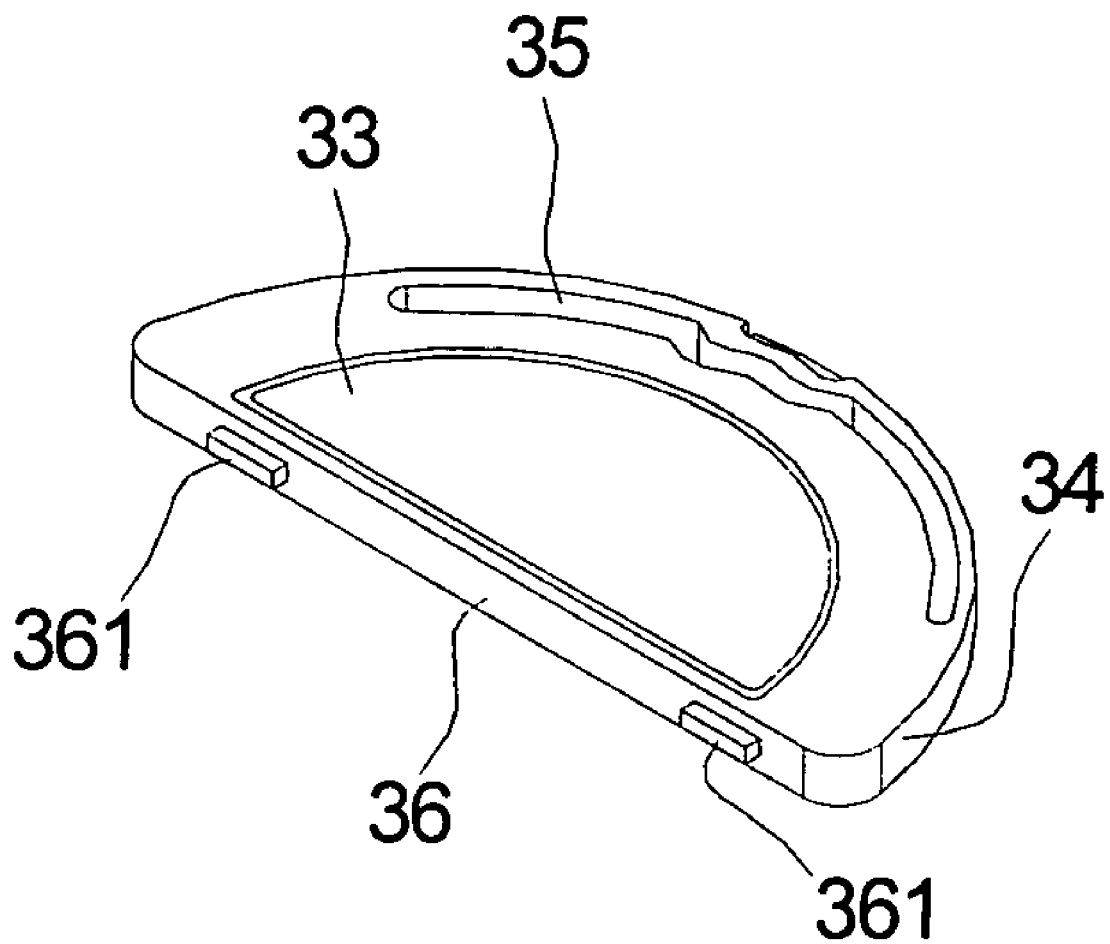
FIG. 4 is a side of perspective view of a replacement board according to the present invention.

The second face of the replacement board has a second pad 33 with a semicircle shape and a larger area (as shown in FIG. 4). The pads 32 and 33 are made of PTFE or UPE and as such are wear-resistant.

The edge of the replacement board 30 has a cambered face 34 and an elongated face 36. The two extremities of the elongated face 36 are connected with the two extremities of the cambered face 34. The center of the cambered face 34 extends to the outer edge of the case 10 and forms a fastening slice 341 facing the outer edge of the case 10. The replacement board 30 forms an arc gap 35 near the cambered face 34. The fastening slice 341 co-operates with the gap 35 to move elastically from a front to a rear. The inside replacement notch 11 of the case 10 has a first notch 111 corresponding to the fastening slice 341. The fastening slice 341 is inserted in the first notch 111.

The elongated face 36 has two raised planks 361 on the opposite side of the fastening slice 341. The inside replacement notch 11 has two second notches 112 corresponding to the two raised planks 361. The two raised planks 361 are inserted in the second notch 112.

To install the replacement board 30, the raised planks 361 are inserted in the second notches 112 at an angle to form a pivot structure. Then the replacement board 30 rotates to cover the bottom of the case 10 via the pivot structure. Furthermore, the fastening slice 341 uses the elasticity provided by co-operating with the gap 35 to enter the replacement notch 11. Then the fastening slice 341 is inserted in the first notch 111 to install the replacement board 30 in the bottom of the case 10.

Therefore the mouse having a changeable pad according to the present invention has a replacement board 30 on the bottom of the mouse. Wherein both the faces of the replacement board 30 have a pad. After using the mouse for a long time, and the pad has become worn out, a user can take the replacement board 30 and turn to the second face of the replacement board 30, and then install the replacement board 30 back to the mouse. So the mouse can use the second face of the replacement board of the pad to keep on working. Therefore the mouse can be altered according to the user's habits and demands to adjust the friction between the mouse and the desktop. Thereby the pad's user life is extended by changing the pads. To sum up, the mouse having a changeable pad according present invention has overcome the problem of the prior art.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to embrace within the scope of the invention as defined in the appended claims.

What is claimed is:

1. A mouse having a changeable pad, comprising:
   a case;
   at least one replacement board having opposing faces, installed in the bottom of the case said replacement board being removable and attachable to said case in either a first or a second orientation; and
   a plurality of pads, with at least one pad installed on each of said opposing faces of the replacement board;
   whereby said replacement board in said first orientation with a first face of said opposing faces directed away from said case is removable from said bottom of said case and is replaceable in said bottom of said case in said second orientation with a second face of said opposing faces directed away from said case.

2. The mouse as claimed in claim 1, wherein the case has a plurality of keys and at least on circuit board inside, the keys are electrically connected to the circuit board, the circuit board has a cursor control unit protruding from the bottom of the case.

3. The mouse as claimed in claim 1, wherein the bottom of the case has a replacement notch corresponding and containing the replacement board.

4. The mouse as claimed in claim 1, wherein the first face of the replacement board has two symmetrical pads and the second face of the replacement board has another pad.

5. The mouse as claimed in claim 1, wherein the outer edge of the replacement board forms a fastening slice extending to the outer edge of the case and inserted into a first notch placed in a replacement notch of the case.

6. The mouse as claimed in claim 5, wherein the replacement board has two raised planks on opposite sides of the fastening slice that are separately inserted into two second notches placed in the replacement notch.

* * * * *